July 17, 1951  C. B. GREENBERG  2,560,947

CHUCK FOR JEWELER'S SCREW DRIVER

Filed May 25, 1948

Charles B. Greenberg
INVENTOR.

BY William Wolfe
ATTORNEY

Patented July 17, 1951

2,560,947

UNITED STATES PATENT OFFICE 2,560,947

CHUCK FOR JEWELER'S SCREW DRIVER

Charles B. Greenberg, New York, N. Y.

Application May 25, 1948, Serial No. 28,992

2 Claims. (Cl. 279—99)

This invention relates to screw drivers and more particularly to the chuck type, removable blade, jeweler's screw driver.

The present invention is an improvement in the structure disclosed in my patent application filed October 15, 1947 and bearing the Serial Number 780,046, in that it provides a more easily formed chuck and one which grips the blade tighter, more uniformly and over a greater surface area.

An object of the invention is to provide a chuck type screw driver in which the chuck grips the blade firmly and over a large surface area.

Another object is to form a screw driver in which the barrel or tube of the driver is provided with an insert capable of co-acting with and retaining a chuck in intimate contact with a blade.

A further object is to form a chuck type screw driver of simple, inexpensive elements, which can be easily assembled and which will securely retain a blade.

These and other objects are accomplished by forming my screw driver of a blade, a chuck, barrel, an insert and a head piece, the chuck having an axial opening there through to carry the blade, a slotted threaded end and a tapering nose like end, and intermediate the ends and adjacent the threaded portion a conic section increasing in diameter away from the threading, the barrel being rotatably secured to the head piece and rigidly supporting and holding the insert, the insert having an axial opening or hole provided with a female threaded portion capable of co-acting with the threaded portion on the chuck and the end of the opening capable of co-acting with the conic section to force the slotted ends of the chuck towards each other and grip the blade, where by an appreciable area of contact occurs between the blade and chuck and the blade is securely retained.

For further comprehension of the invention, and of the objects and advantages thereof, reference will be had to the following description, the accompanying drawings and to the appended claims in which the various novel features of the invention are more particularly set forth.

In the accompanying drawings forming a material part of this disclosure:

Figure 1:
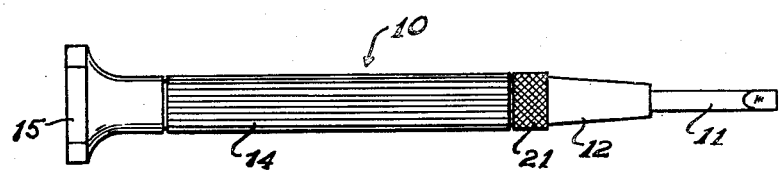
Fig. 1 is a plan view of a jeweler's screw driver embodying my invention and shown comprised of a blade, chuck, barrel and head piece.
Figure 2:
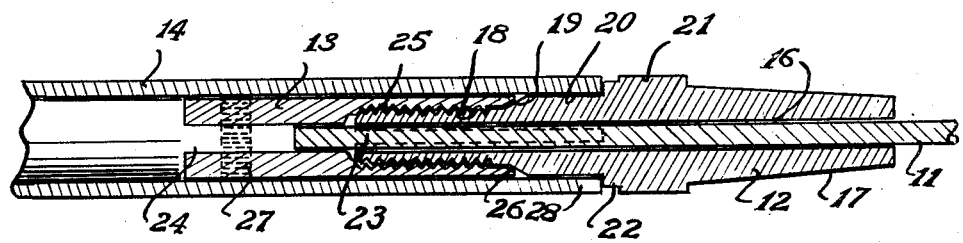
Fig. 2 is a longitudinal sectional view taken through the center of the screw driver shown in Fig. 1 and shows an insert as well as other screw driver elements.

In the drawings and in the specification, in which like numbers denote similar elements, a screw driver 10 is shown comprised of a blade 11, chuck 12, insert 13, barrel 14 and a head piece 15 rotatably secured to the barrel 14.

The blade 10 and head piece 15 are of the common type used in assembling chuck type jewelers' screw drivers.

The chuck 12, however, is of a new design. It is tubular in shape having a bore 16 suitable for carrying the blade 11 and is provided at one end with a tapering nose 17 forming a guard about the blade 11 and at the other end with a threaded section 18. A conic section 19, of increasing diameter, is positioned in the vicinity of the inner end of the threading and terminates in an intermediate section 20 of comparatively great length. A knurled section 21 having the same diameter as the barrel 14 is positioned adjacent the inner end of the nose 17 and between the knurled section 21 and the intermediate section 20 is a thin shoulder 22 having a diameter slightly less than that of the knurled section. Two longitudinal slots 23 extend inwardly from the threaded end to the vicinity of the shoulder 22.

The insert 13 is tubular in shape having a bore 24 suitable to carry the blade 11 and a female threaded section 25, of larger diameter, capable of co-acting with the threaded section 18 of the chuck. Adjacent the threaded section 25 there is positioned a conic section 26 having a slope corresponding to the conic section 19 so that the two sections can co-act together. A serrated outer surface 27 is provided for the insert 13 so that it can be securely gripped and permanently held within the barrel 14. An end of the barrel 27 extends beyond the insert and when the driver is assembled, rests about the intermediate section 20 and against the thin shoulder 22 of the chuck.

When the driver is assembled with the blade in the chuck and the insert is screwed about the chuck, the conic section of the insert slides along and compresses the conic section of the chuck which in turn grips and holds the blade.

As the slots of the chuck are relatively long and its conic section is positioned intermediate the ends of the slots, a relatively long portion of the chuck can be articulated or moved by the pressure of the cone of the insert. This results in large area of contact between the chuck and the blade and a relatively greater gripping pressure to hold the blade.

While I have illustrated and described only the preferred form of the invention, it is to be understood that I do not limit myself to the precise construction herein disclosed and the right is reserved to all the changes and modifications coming within the scope of the invention as defined in any or all of the appended claims.

Having thus described my invention, what I claim as new and desire to secure by United States Letters Patent, is:

1. In a separable gripping means of the chuck type, a male and a co-operating female element, the female element having a conic section and a threaded portion, the threaded portion being positioned inwardly of the conic section, and the male element having a longitudinal opening therethrough capable of admitting an element desired to be held, a threaded portion and a conic section, said threaded section being positioned between the conic section and an end of the male element and the male element being slotted longitudinally in the vicinity of its threaded and conic sections whereby when the elements function together an appreciable area of the male element can be strained to a gripping position by the stress of the female conic section on its male counterpart.

2. In a screw driver of the chuck type, a barrel and a co-acting chuck, the barrel having an opening therein terminating at its open end in a conic section and inwardly thereof containing a threaded section, the chuck having a longitudinal opening therethrough capable of containing the blade desired to be held, a threaded section and a conic section, said threaded section being positioned at one end of the chuck and said conic section being positioned removed from the ends of the chuck and in the vicinity of the inner end of the threaded section and the chuck being longitudinally slotted in the vicinity of the threaded and conic sections, whereby when the chuck is advanced into the barrel the conic section of the barrel exerts a pressure on the conic section of the chuck and an appreciable part of the chuck can be strained to effect a grip on the blade desired to be retained in the chuck opening.

CHARLES B. GREENBERG.

REFERENCES CITED

The following references are of record in the file of this patent:

UNITED STATES PATENTS

| Number | Name | Date |
| --- | --- | --- |
| 348,765 | Neal | Sept. 7, 1886 |
| 861,717 | Frankel | July 30, 1907 |
| 1,057,101 | Wachter | Mar. 25, 1913 |
| 2,037,681 | Gates | Apr. 14, 1936 |